(12) United States Patent
Jeong et al.

(10) Patent No.: US 8,024,552 B2
(45) Date of Patent: Sep. 20, 2011

(54) PERFORMING VARIABLE AND/OR BITWISE SHIFT OPERATION FOR A SHIFT INSTRUCTION THAT DOES NOT PROVIDE A VARIABLE OR BITWISE SHIFT OPTION

(75) Inventors: Hyeonkuk Jeong, San Jose, CA (US); Paul Chang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 92 days.

(21) Appl. No.: 12/573,876

(22) Filed: Oct. 5, 2009

(65) Prior Publication Data

US 2010/0174765 A1    Jul. 8, 2010

Related U.S. Application Data

(63) Continuation of application No. 11/422,325, filed on Jun. 5, 2006, now Pat. No. 7,610,472.

(60) Provisional application No. 60/687,665, filed on Jun. 5, 2005.

(51) Int. Cl.
*G06F 9/315* (2006.01)
(52) U.S. Cl. ........................ 712/223; 708/209
(58) Field of Classification Search .................. 712/223; 708/208
See application file for complete search history.

(56) References Cited

U.S. PATENT DOCUMENTS

| | | | |
|---|---|---|---|
| 4,785,393 A | 11/1988 | Chu et al. | |
| 5,479,527 A | 12/1995 | Chen | |
| 5,526,296 A | 6/1996 | Nakahara et al. | |
| 5,642,115 A | 6/1997 | Chen | |
| 5,651,121 A | 7/1997 | Davies | |
| 5,812,701 A | 9/1998 | Chen | |
| 5,913,229 A | 6/1999 | Joo | |
| 5,923,871 A * | 7/1999 | Gorshtein et al. | 712/221 |
| 6,223,277 B1 | 4/2001 | Karguth | |
| 7,054,367 B2 * | 5/2006 | Oguz et al. | 375/240.23 |
| 7,320,013 B2 * | 1/2008 | Mukund et al. | 708/209 |
| 7,370,184 B2 * | 5/2008 | Sandbote | 712/300 |
| 7,373,369 B2 * | 5/2008 | Gerwig et al. | 708/505 |

(Continued)

FOREIGN PATENT DOCUMENTS

EP    0649224    4/1995

OTHER PUBLICATIONS

U.S. Appl. No. 11/422,325, filed Sep. 18, 2009, Jeong, Hyeonkuk, et al.

(Continued)

*Primary Examiner* — Aimee J Li
(74) *Attorney, Agent, or Firm* — Adeli & Tollen LLP

(57) ABSTRACT

Some embodiments present a method of performing a variable shift operation. This method can be used by a microprocessor that does not allow variable shift operation for certain operand sizes. The method simulates a shift instruction that shifts an operand by a shift count. The method identifies a first shift command and a second shift command. The method computes a mask value. The mask value depends on whether the shift count is less than half of the operand size or greater than or equal to half of the operand size. The method uses the mask value to cause one of the first shift command and the second shift command to produce no shift. In some embodiments, the method allows for the shift count to be specified in bytes or in bits.

22 Claims, 4 Drawing Sheets

405 → Register 0 after quadword aligned move

410 → Register 1 after quadword aligned move

415 → Register 0 after shifted left using a 'shift double quadword left logical' instruction with a variable shift count operand 420 → Register 1 after shifted right using a 'shift double quadword right logical' instruction with a variable shift count operand 425 → Register 0 after the two registers 0 and 1 are OR'd together and the result is saved in register 0

U.S. PATENT DOCUMENTS

| | | |
|---|---|---|
| 7,610,472 B2 | 10/2009 | Jeong et al. |
| 7,757,066 B2 * | 7/2010 | Jarvis et al. .................... 712/204 |
| 7,921,263 B2 * | 4/2011 | Taunton ........................ 711/154 |
| 2003/0041229 A1 | 2/2003 | Sandbote |
| 2004/0008711 A1 | 1/2004 | Lahti et al. |
| 2004/0153494 A1 * | 8/2004 | Mukund et al. ............... 709/200 |
| 2004/0210610 A1 * | 10/2004 | Mukund et al. ............... 708/209 |
| 2004/0267861 A1 * | 12/2004 | Gerwig et al. ................ 708/670 |
| 2005/0099841 A1 * | 5/2005 | Mukund et al. ............... 365/154 |

OTHER PUBLICATIONS

Author Unknown, "IA-32 Intel Architecture Software Developer's Manual," Month N/A 2003, p. 3-624, vol. 2: Instruction Set Reference, Intel Corporation, Colorado, USA.

* cited by examiner

Register 0 after double
quad unaligned move

PERFORMING VARIABLE AND/OR BITWISE SHIFT OPERATION FOR A SHIFT INSTRUCTION THAT DOES NOT PROVIDE A VARIABLE OR BITWISE SHIFT OPTION

CLAIM OF BENEFIT TO PRIOR APPLICATIONS

This application is a continuation application of U.S. patent application Ser. No. 11/422,325, now U.S. Pat. No. 7,610,472 entitled "Performing Variable and/or Bitwise Shift Operation for a Shift Instruction that does not Provide a Variable Or Bitwise Shift Option", filed Jun. 5, 2006, now issued as U.S. Pat. No. 7,610,472 which is incorporated herein by reference. U.S. patent application Ser. No. 11/422, 325 claims the benefit of U.S. Provisional Application 60/687,665, entitled "Performing Variable and/or Bitwise Shift Operation for a Shift Instruction that does not Provide a Variable Or Bitwise Shift Option", filed Jun. 5, 2005.

FIELD OF THE INVENTION

The invention relates to enhancing instruction sets for microprocessors.

BACKGROUND OF THE INVENTION

Shift instructions for microprocessor general-purpose registers often take two parameters as operand. The first operand specifies a designation register whose value is being shifted. The second operand is the count operand that specifies the amount by which the register is being shifted. The count operand may be a variable or a constant. If it is a variable, it may be specified as the value contained in another register or in a memory location. If it is a constant, it is defined by a predetermined value at coding time.

Some shift operands in a microprocessor instruction set may be limited to accepting a constant value as the count operand. Some shift instructions are further limited to shifting the register value by a large amount, e.g., shifting by bytes instead of by bits.

Previously, to simulate a shift by a variable amount, programmers have utilized instruction loops. For instance, a loop specifying a value of 1 for the shift count can be called repeatedly a variable amount of times to shift a register value by the desired amount.

In order to shift in bits instead of bytes, the programmers have previously looked at the microprocessor instruction set to find other shift instructions that allow shifting in bits and have utilized those instructions to simulate the desired shift operation in bits. For example, in the Intel® x86 architecture, the instruction for shifting a double quadword (where a word is 16 bits or 2 bytes) does not allow shifting in bits but the instruction for shifting a quadword does allow shifting in bits. Accordingly, in this architecture, some programmers who want to shift a double quadword register would write code to use the quadword shift instruction to generate missing bits from the other side and then would perform a logical 'or' operation on them to make the final result.

To illustrate this further, three more specific examples are provided for the Intel® x86 architecture. The Intel® SSE2 (Streaming SIMD Extensions 2) instruction set has PSLLDQ and PSRLDQ instructions for shift double quadword left logical and shift double quadword right logical respectively. These instructions shift a whole 128-bit register by a given constant value of bytes to left or right respectively. However, these instructions neither allow for variable shift operations nor allow for bitwise shift operations. Hence, to perform variable or bitwise 128-bit shift operations, programmers have to resort to other smaller shift operations in the SSE2 instruction set. Examples of such shift operations are the PSLLQ and PSRLQ shift operations that can variably shift a 64-bit value by a given bit value to left or right respectively.

The following three examples illustrate how programmers have used these smaller shift operations to simulate the shift double quadword to left or right operations. The first example shows shifting a double quadword to left by 5 bytes. The second example shows shifting a double quadword register to left by 10 bytes. As shown in these two examples, simulating either a variable byte shift or shifting by bits instead of bytes require different processing for the case where count operand is less than 8 when shifting in byes (less than 64 when shifting in bits) and the case where the operand is greater or equal to 8 (greater than equal to 64 when shifting in bits). The third example shows how shifting a double quadword may be implemented using a loop.

Example 1

Shift Double Quadword Left by 5 Bytes

To perform a double quadword shift left operation by 5 bytes, some programmers previously performed the following six operations:

First, a 16 byte value that is to be shifted is initially loaded into registers 0 and 1. For instance, after this load, each register will contain:

|01234567|89ABCDEF|, where each character represents a byte.

Second, the value of the shift count is retrieved from a register. In this example, the value is equal to 5. Hence, the shift count variable n is set to 5.

Third, the 'shift quadword left logical' instruction is utilized to shift the value of register 0 to left by n bytes (where n is 5 in this example). Since this instruction shifts by bits, the shift count is set to n*8 (i.e., 40). After this shift, register 0 will contain:

|567#####|DEF#####| where # is a byte with all zero bits.

Fourth, 'shift quadword right logical' instruction is utilized to shift the value of register 1 to right by 8 minus n, which in this case will be 3 bytes. Register 1 will then contain:

|###01234|###89ABC|

Fifth, the 'shift double quadword left logical' is utilized to shift the value of register 1 left by 8 bytes. Register 1 will then contain:

|###89ABC|########|

Sixth, an 'OR' operation is performed on the two registers and the result is saved in register 0. Register 0 will then contain:

|56789ABC|DEF#####|

The original value is, therefore, shifted to left by 5 bytes.

The above method, however, does not work if the shift count is greater or equal to 8. The following shows how the shift is performed by prior art for a 10 bytes shift to left operation.

Example 2

Shift Double Quadword Left by 10 Bytes

To perform a double quadword shift left operation by 10 bytes, some programmers previously performed the following four operations:

First, a 16 byte value that is to be shifted is initially loaded into register 0. Register 0 will contain:

|0123456789ABCDEF|, where each character represents a byte.

Second, the value of the shift count is retrieved from a register. In this example, the value is equal to 10. Hence, the shift count variable n is set to 10 bytes.

Third, the 'shift quadword left logical' instruction is utilized to shift the value of register 0 to left by n−8 (i.e., 2) bytes. Since this instruction shifts by bits, the shift count is set to (n−8)*8 (i.e., 16) bits. Register 0 will then contain:

|234567##|ABCDEF##| where # is a byte with all zero bits.

Fourth, the 'shift double quadword left logical' is utilized to shift the value of register 0 to left by 8 bytes. Note that since this shift is always for 8 bytes, the 'shift double quadword left logical' instruction that accepts a constant value can be used for this operation. Register 0 will contain:

|ABCDEF##|########|

The original value has, therefore, been shifted to left by 10 bytes. By using appropriate bit counts instead of byte counts in the above examples, this method can be used to do bitwise shifting. Since there are two different methods used to handle the shift for less than 8 bytes and the shift for 8 or more bytes, an extra branch operation is needed to decide which method to execute. A branch operation, however, is time consuming, and therefore slows down an algorithm (such as a video codec) that may need many double quadword shifts. Use of branch operation inside a loop in a program is time consuming and therefore, it is desirable to come up with new methods to avoid branch operations.

Example 3

Shift Double Quadword Left Implemented by a Loop

To perform a double quadword shift left operation by n bytes (for instance 5 bytes), some programmers previously performed the following loop operation:

```
n = 5;
for (i=0; i<n; i++)
{
    PSLLDQ xmm0, 1
}
```

Here, the value of register is shifted left by 1 byte inside the loop and the loop is repeated as many times as required to achieve the desired shift. This method is limited to shifting in bytes rather than bits. The above method has the draw back of requiring a loop operation. Another drawback of this method is that the time taken for the shifting will vary based on the value of n.

As the above three examples illustrate, the simulation of the double quadword shift required the use of loops or branches which could be time consuming. For instance, in applications such as motion compensation in video codecs, where many double quadword shifts are performed, significant performance degradation may be observed. Similarly, the same shortcoming for shifting certain operand sizes may exist in other microprocessors. Therefore, there is a need in the art to have a single method for a shift operation that accepts a variable shift count, does not require a branch operation, and is capable of shifting in bytes as well as shifting in bits.

SUMMARY OF THE INVENTION

Some embodiments present a method of performing a variable shift operation. This method can be used by a microprocessor that does not allow variable shift operation for certain operand sizes. The method simulates a shift instruction that shifts an operand by a shift count. The method identifies a first shift command and a second shift command. The method computes a mask value. The mask value depends on whether the shift count is less than half of the operand size or greater than or equal to half of the operand size. The method uses the mask value to cause one of the first shift command and the second shift command to produce no shift. In some embodiments, the method allows for the shift count to be specified in bytes or in bits.

Many applications require repeated moving of blocks of data from one memory location to other memory locations. Some embodiments provide a method of moving blocks of memory to or from addresses that are not aligned at any specific address location. Each move operation may require one or more shift operations with variable shift count. The move operations may also require bitwise shifting, i.e., shifting the operand a variable number of bit positions.

Some embodiments of the invention simulate a shift operation that cannot perform a variable or bitwise shift, by utilizing smaller shift operations that allow variable or bitwise shift operations. In the examples below, the shift operation that cannot perform variable or bitwise shifting is a double quadword target operation in the Intel® SSE2 instruction set. However, one of ordinary skill will realize that the invention is applicable to other shift operations that cannot perform variable or bitwise shifting.

In order to simulate a shift operation, a novel algorithm is presented that allows the shift count to be a variable as well as a constant and the shift count can be specified in bytes or bits. The algorithm does not require a branch operation to distinguish between a shift for less than half the length of the operand and a shift equal or grater than half the length of the operand. In the following examples, a 'shift double quadword' left operation PSLLDQ of the instruction set of Intel® SSE2 is used to illustrate how the invention performs variable or bitwise shifting on a double quadword basis. One of ordinary skill will realize that the same method may be applied for shift right operation and for shifting in bits instead of bytes. The same method can also be applied to any other microprocessor instruction set that has the same limitations for a shift operation that only accepts a constant shift count or only shifts in bytes when other smaller shift operations without the limitations are available.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

Figure 1:
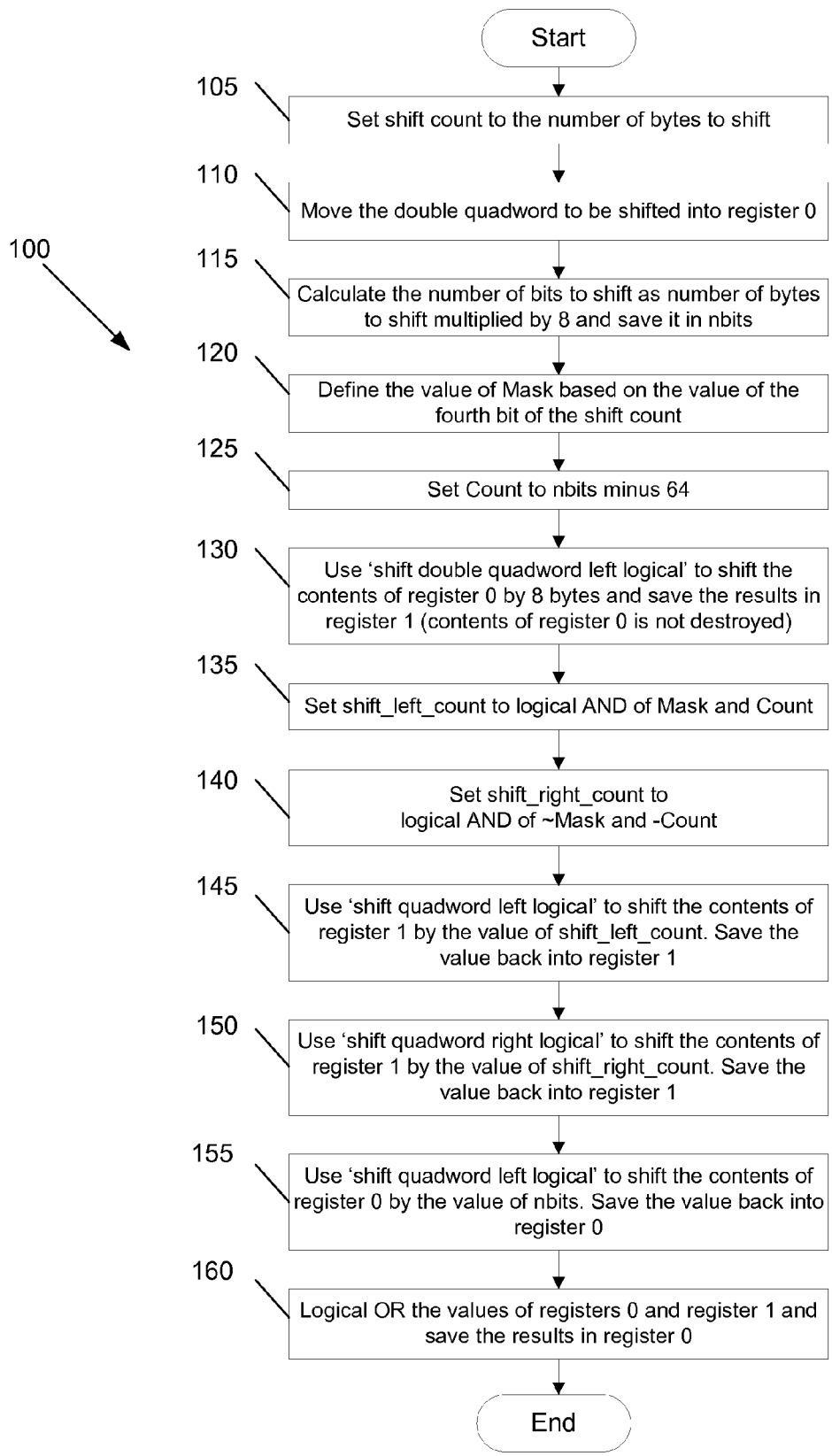
FIG. 1 presents a process that illustrates the method of implementing the double quadword shift with a variable shift operand in some embodiments of the invention.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments present a method of performing a variable shift operation. This method can be used by a microprocessor that does not allow variable shift operation for certain operand sizes. The method simulates a shift instruction that shifts an operand by a shift count. The method identifies a first shift command and a second shift command. The method computes a mask value. The mask value depends on whether the shift count is less than half of the operand size or greater than or equal to half of the operand size. The method uses the mask value to cause one of the first shift command and the second shift command to produce no shift. In some embodiments, the method allows for the shift count to be specified in bytes or in bits.

To further illustrate the invention, several examples of different implementations of the invention are described below. These examples are described by reference to particular microprocessor architecture. Specifically, these examples refer to the Intel® SSE2 instruction set that does not include a variable or bitwise shift double quadword instruction. However, one of ordinary skill will realize that the invention is applicable to other shift instructions that cannot perform variable or bitwise shifting.

In order to simulate the operation of a shift operation, a novel algorithm is presented that allows the shift count to be a variable as well as a constant and the shift count can be specified in bytes or bits. The algorithm does not require a branch operation to distinguish between a shift for less than half the length of the operand and a shift for half the length of the operand or more. The algorithm simulates the shift instruction that cannot perform a variable or bitwise shift, by utilizing smaller shift instructions that allow variable or bitwise shift operations. In the following examples, a 'shift double quadword' left operation PSLLDQ of the instruction set of Intel® SSE2 is used to illustrate how the invention performs variable or bitwise shifting on a double quadword basis. One of ordinary skill in the art will realize that the same method may be applied for shift right operation and for a shifting in bits instead of bytes. One of ordinary skill in the art will also realize that the same method can also be applied to any other microprocessor instruction set that has the same limitations for a shift operation that only accepts a constant shift count or only shifts in bytes when other smaller shift operations without the limitations are available.

Several more detailed embodiments of the invention are described in sections below. Section I describes a process for performing variable or bitwise shift operations. The process is described by using two examples for a shift count of less than half the operand size and a shift count of equal to or greater than the operand size. Section II describes several examples of the application of such variable or bitwise shift operation. Specifically, Section II.A describes a method of performing unaligned move operations to or from memory. Last, Section MB describes a method of moving blocks of data that are not aligned to a particular byte boundary during a video codec motion compensation operation.

I. Double Quadword Shift Left Operation

FIG. 1 illustrates an example of a shifting process 100 of some embodiments. This process performs a variable double quadword shift left operation. Initially this process will be explained by reference to an example where the shift count is less than half the operand size. After this process is described, another example of performing this process for shift left for larger than or equal to half the operand size is described.

As shown in FIG. 1, the shift count is set (at 105) to the number of bytes to shift. Next, at 110, the process 100 moves the double quadword to be shifted into register 0. After this operation, register 0 will contain the following value:

|01234567|89ABCDEF|, where each character represents a byte.

Next, at 115, the number of bits to shift is calculated by multiplying the number of bytes to shift by 8 and the result is assigned to "nbits" variable. This operation is performed because the method utilizes other instructions of the microprocessor instruction set (such as PSLLQ and PSRLQ) that require a bit count to perform the shift operation. Using shift count of 5 bytes, as an example, would result in a value of 40 for nbits.

Next, in order to distinguish between a shift count of less than half of the operand size and a shift count of greater than or equal to half of the operand size, the process 100 defines (at 120) a mask value (referred to herein as Mask) based on the value of the fourth bit of the shift count. In order to shift a 16-byte register by a multiple of bytes, the shift count will be between 0 and 15. In a binary representation of a value, number 7 is represented as 111 with as many leading zeros as required to fit in a register. For example, a 32 bit value of 7 is represented as 00000000000000000000000000000111. Similarly, value of eight is represented as 00000000000000000000000000001000 and a value of fifteen is represented as 00000000000000000000000000001111. Any number between eight and fifteen would, therefore, have its fourth bit from the right set to 1 and any number less than eight would have its fourth bit from right set to 0. If the shift count is specified with the number of bits to shift instead of number of bytes, the value of the shift count will be between 0 and 127. Therefore, the seventh bit from the right will determine the value of the Mask.

The Mask can be defined by shifting the signed integer shift count to left by 28 bits, which would result in the most significant bit to be 0 if the fourth bit was 0 and the most significant bit to be 1 if the fourth bit was 1. The signed integer value is then shifted right by 31 bits, which results in all 0's if the previous result had a 0 in the most significant location and all 1's if the previous result had a 1 in the most significant location. A person of ordinary skill in the art would realize that for microprocessors that use a shift count size other than 4 bytes, the size of the Mask would be adjusted accordingly. For instance, for a microprocessor with a shift count size of 8 bytes, the size of the Mask would also be 8 bytes.

Next, at 125, the value of Count is set to nbits minus 64. For the 5 bytes shift example, Count would be −24. The process 100 uses (at 130) a 'shift double quadword left logical' operation to shift the contents of register 0 by 8 bytes and saves the results in register 1. Note that since this shift is always for 8 bytes, the 'shift double quadword left logical' instruction that accepts a constant value can be used for this operation. The operation is:

xmm1=PSLLDQ xmm0, 8.

At the end of this operation, register 1 would contain the following value:

|89ABCDEF|########|, where # represents a byte with all zero bits.

Next, at 135, the process 100 sets the shift_left_count variable to logical AND of Mask and Count which would result in a value of 0. Similarly, at 140, the shift_right_count variable is set to logical AND of (–Count) and (~Mask), where –Count is the negative of the Count and the symbol ~ (bitwise NOT) in front of Mask is used to specify that the value of Mask is inversed by setting all 0's to 1's and all 1' to 0's before performing the AND operation. The result would be a value of 24 for shift_right_count.

The process 100 utilizes (at 145) the 'shift quadword left logical' operation to shift the contents of register 1 to left by the value of shift_left_count and to save the results back in register 1. The operation is:

xmm1=PSLLQ xmm1, shift_left_count.

Since the shift value is 0, the value of register 1 would remain unchanged.

Next, at 150, the 'shift quadword right logical' operation is used to shift the contents of register 1 right by shift_right_count. The operation is:

xmm1=PSRLQ xmm1, shift_right_count and register 1 would contain the following value:

|###89ABC|########|

Next, at 155, the 'shift quadword left logical' operation is used to shift register 0 to left by nbits. The operation is xmm0=PSLLQ xmm0, nbits.

This operation will shift each 64 bit quadword in register 0 by 40 bits to left. Register 0 will contain the following value:

|567#####|DEF#####|

Finally, at 160, process 100 performs a logical OR on the values of register 0 and 1 and saves the final results in register 0. The original value is now shifted to left by 5 bytes. The operation to do the logical OR is:

xmm0=POR xmm0, xmm1.

The final value of register 0 would be |56789ABC|DEF#####| which is the original double quadword shifted to left by 5 bytes.

The shifting process 100 of FIG. 1 was described above by reference to an example where the shift count was less than half the operand size. The following example shows how a variable or bitwise shift left operation can be performed when the shift count is equal or more than half the operand size. In case of a double quadword operand size, the exact same operations as described above can be performed to shift the double quadword by 8 or more bytes. As an example, the results of a shift double quadword left by 10 bytes after each step are given below.

At step 105, the shift count is set to 10.
    After step 110, register 0 will contain |01234567|89ABC-DEF|.
    At step 115, nbits is set to 80 (which is 8 times the shift count).
    At step 120, the value of Mask is set to all 1's.
    At step 125, the Count is set to nbits minus 64, resulting in a value of 16 for Count.
    After step 130, register 1 will contain|89ABCDEF|########|.
    At step 135, shift_left_count is set to 16 (which is the logical AND of Mask and Count).
    At step 140, shift_right_count is set to 0 (which is the logical AND of (–Count) and (~Mask). Note that in this case since Mask is all 1's, ~Mask would be set to all 0's resulting in shift_right_count to become 0.
    After step 145, register 1 will contain|ABCDEF##|########).
    After step 150, register 1 will contain|ABCDEF##|########). Note that since shift_right_count is 0, the value of register 1 did not change in this step.
    At step 155, register 0 is shifted by the value of nbits (i.e., 80) in each 64 bit quadword. Register 0 will, therefore, contain |########|########| which is all 0's.
    Finally, at step 160, the value of the two registers are OR'd together and the result is saved in register 0. The final value in register 0 will be |ABCDEF##|########| which is the original double quadword shifted to left by 10 bytes.

The Mask value, therefore, normalizes the shift count value for the two possible cases of a shift count of less than half of the operand length and a shift count of greater than or equal to half of the operand length. A person of ordinary skill would be able to easily extend the above described method to implement an equivalent double quadword shift right and/or a bitwise shift operation.

II. Examples of the Application of Shift Double Quadword with a Variable Operand Many applications exist in which a double quadword has to be shifted a variable number of bytes or bits. The following examples describe some applications of this operation. The first example describes the use of the shift operation in moving to or from memory, double quadwords that are not aligned on a 16-bytes boundary by only using aligned move instructions. The next example describes the use of the shift operation in a video motion compensation application.

A. Unaligned Double Quadword Move

The shift operation with variable operand explained in Section I can be used to implement an unaligned move without using a time consuming unaligned double quadword operation provided in the instruction set of a microprocessor. Although the double quadword operand is used as example, a person of ordinary skill in the art would be able to apply the disclosed technique to other operand sizes.

Figure 2:
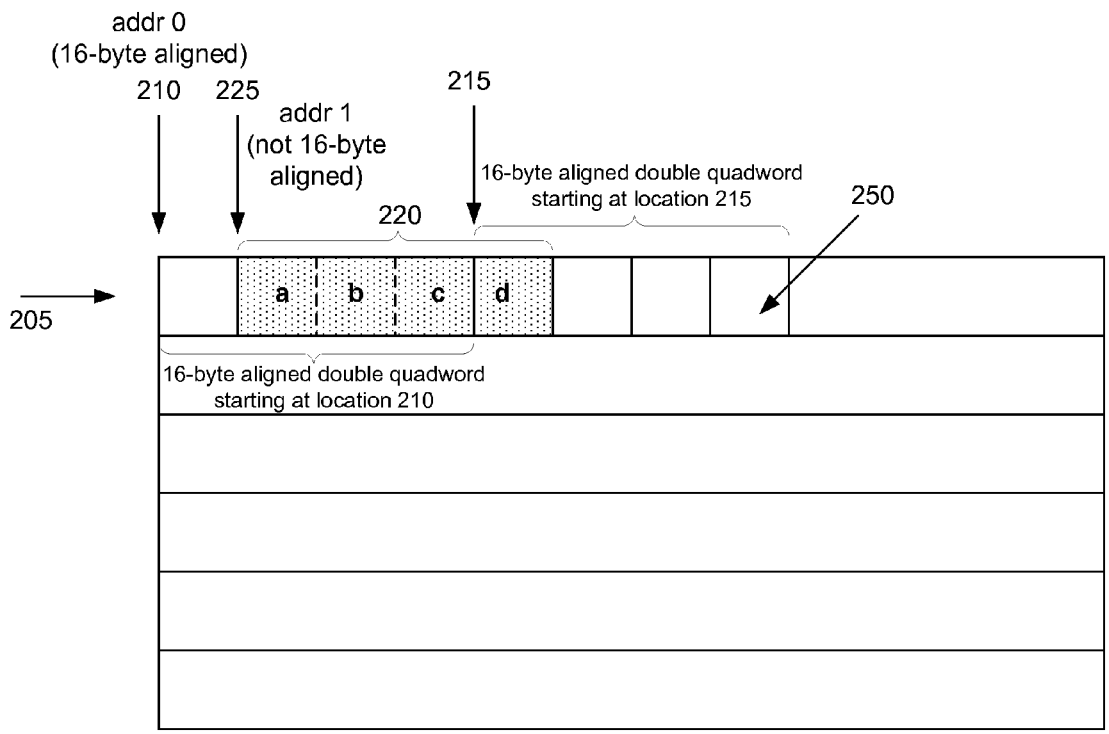
FIG. 2 illustrates a double quadword located in a location in memory that is not aligned on a 16-byte boundary.

FIG. 2 illustrates a contiguous piece of memory 205 in some embodiments of the invention. Each small rectangle (such as 250) represents a set of four bytes. Two sets of 16 bytes (starting at 210 and 215) are illustrated in FIG. 2. In some applications, it is desirable to move a double quadword (such as double quadword 220 that is identified by shading in FIG. 2 that is not 16 byte-aligned) to or from the memory 205. This double quadword starts from addr 1 (starting at 225), which is not on byte zero or a byte that is a multiple of 16. This double quadword has four sets of four bytes, a, b, c, and d, where the first three sets (a, b, and c) are part of the first set of 16 bytes (which starts at 210) and the fourth set (d) is part of the second set of 16 bytes (which starts at 215).

Figure 3:
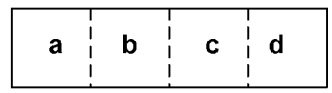
FIG. 3 illustrates the result of a time consuming 'unaligned double quadword' load of the double quadword depicted in FIG. 2 into a register.

Using Intel® SSE2 instruction set as an example, one can use the unaligned double quadword move instruction, MOVDQU, to load the value of double quadword 220 into a register (e.g., register 0) by using the following instruction: MOVDQU xmm0, addr1. FIG. 3 illustrates the contents of register 0 after this operation. The unaligned double quadword move is, however, time consuming and repeated use of this instruction may degrade the program performance.

Figure 4:
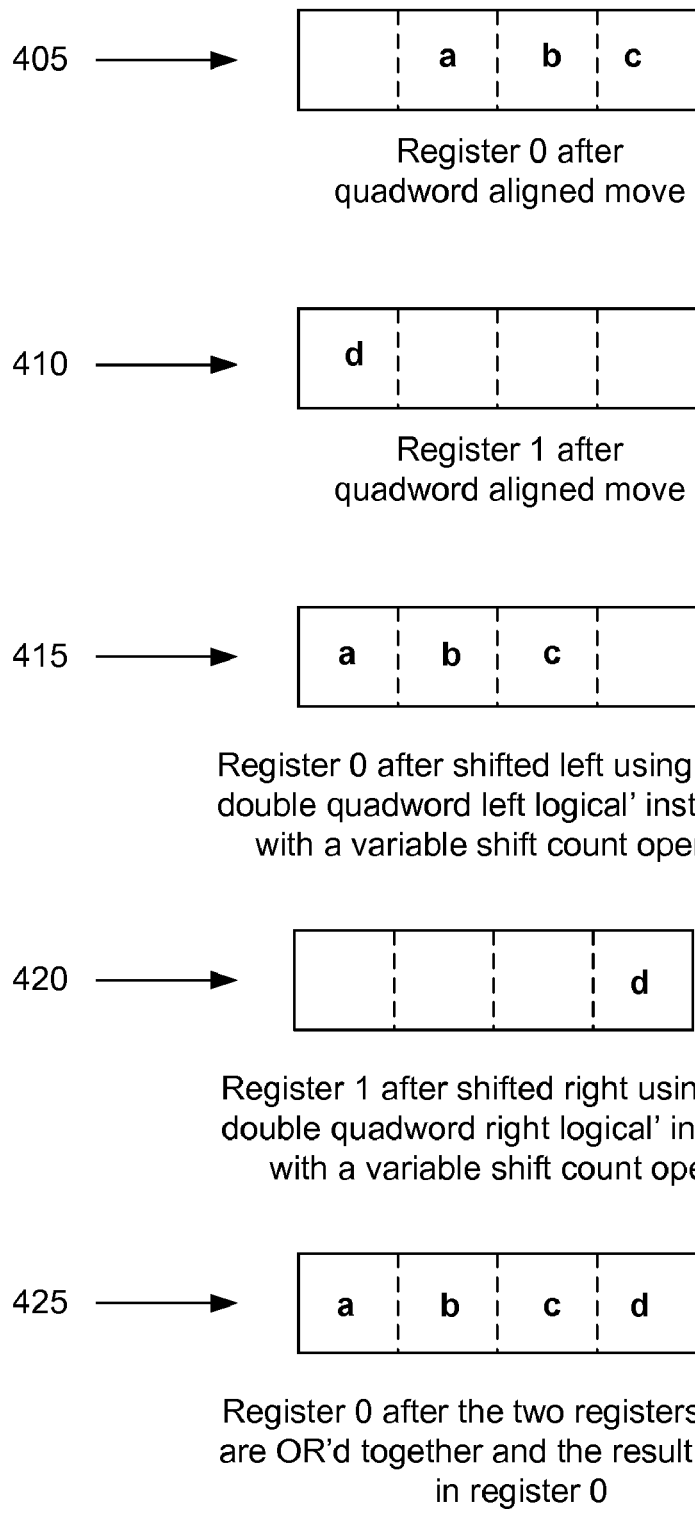
FIG. 4 illustrates different steps of moving the quadword depicted in FIG. 2 into a register by utilizing the efficient 'aligned quadword' loads operations followed by 'double quadword' shift with variable shift operand followed by an OR operation.

As an alternative, the following five operations can be used to perform the same operation without using the time consuming unaligned move. These five operations are illustrated by reference to FIG. 4. As shown in this figure, the first operation is an aligned move to move the double quadword value 210 starting at address addr 0 into register 0. The instruction to perform this operation is: MOVDQA xmm0, addr0. The contents of register 0 after this operation are illustrated in snapshot 405 in FIG. 4.

Second, an aligned move is used to move the double quadword value starting at address 215 into register 1. The instruction to perform this operation is: MOVDQA xmm1, (addr0+16). The contents of register 1 after this operation are illustrated in snapshot 410 in FIG. 4.

Third, using the method described in Section I, the 'shift double quadword left' operation with a variable shift count operand is used to shift the contents of register 0 (shown in snapshot 405) left by (addr 1 & 7). The operation addr 1 & 7 denotes the bitwise AND of the unaligned address "addr 1" and number 7 which results in the 3 least significant bits in the address. The result of this operation is illustrated in snapshot 415 in FIG. 4.

Fourth, the 'shift double quadword right' with a variable shift count operand is used to shift the contents of register 1 (shown in snapshot 410) to right by (16−(addr 1 & 7)). The result of this operation is illustrated in snapshot 420 in FIG. 4.

Fifth, the contents of register 0 (shown in snapshot 415) and the contents of register 1 (shown in snapshot 420) are OR'd together and the result is stored in register 0. The final value of register 0 is shown in snapshot 425 in FIG. 4. The double quadword 220 that was not aligned on 16-bytes boundary has been loaded into register 0 without using the unaligned double quadword move operation. A similar operation can be used to store contents of double quadword registers in unaligned locations of memory.

Although the example shown in this subsection shows the double quadword 220 at a 4-byte offset with address 210 (which is 16-byte aligned), a person of ordinary skill in the art would be able to apply the method described above to any other offset value from 1 to 15.

B. Motion Compensation

Figure 5:
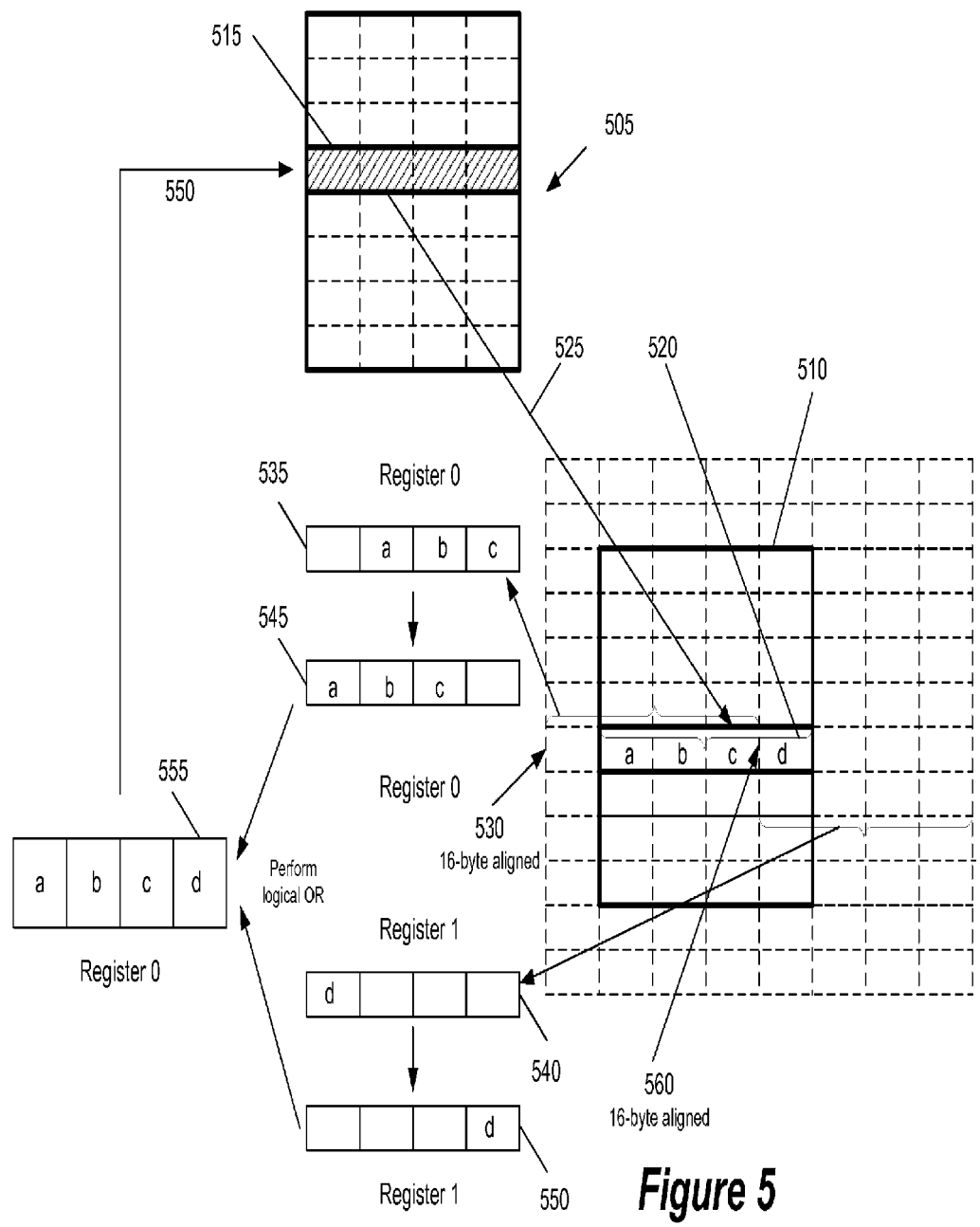
FIG. 5 illustrates the application of 'shift double quadword' with variable shift count in a motion compensation operation.

The shift double quadword with variable operand and the unaligned double quadword move explained above can be used in a video motion compensation operation. FIG. 5 illustrates a 16×8 byte partition of a macroblock 505 in a video frame. The motion compensation operation builds different portions of this macroblock such as the sixteen-byte block 515 by using a reference frame 510 and a motion vector 525.

The motion vector 525 specifies the location in the reference frame 510 where the values for block 515 can be found. Once the source block 520 (where each character denotes 4 bytes) is identified, it is desired to move the contents of this block onto the target block 515. When the source block 520 starts from a memory location that is not 16-byte aligned, some embodiments perform an unaligned double quadword move similar to the method described in Section II.A above to avoid a time consuming unaligned double quadword move operation provided in the microprocessor instruction set.

In the example illustrated in FIG. 5, the two addresses 530 and 560 are at 16-byte aligned locations. As shown, the 16-byte block 520 does not start at a 16-byte aligned address. In order to perform the above operation, the content of the 16-byte aligned memory block which starts at 530 is first loaded into register 0 using an aligned double quadword shift operation. The result is shown in snapshot 535. Similarly, the content of the second 16-byte aligned memory block starting at location 560 is loaded into register 1. The result is shown in snapshot 540.

Next, the content of register 0 is shifted left using the shift double quadword with a variable shift operand (that was described in Section I). The content of register 0 after this operation is shown in FIG. 5 (at snapshot 545). Similarly, the content of register 1 is shifted right using the shift double quadword with a variable shift operand (that was described in Section I). The content of register 1 after this operation is shown in FIG. 5 (at snapshot 550).

Next, the contents of registers 1 and register 2 are OR'd together and the result is placed in register 0. The result is shown in FIG. 5 (at snapshot 555). Next the content of register 0 is moved into target location 515. If the target location is at a 16-byte aligned address location, the content of register 0 is moved into block 515 using an aligned double quadword move provided in the microprocessor instruction set. Otherwise, a method similar to the move from 520 to 555 is used, this time to move the content of register 0 into the unaligned memory location 515.

A person of ordinary skill in the art would realize that the double quadword 520 may have any offset from 1 to 15 bytes from address 530 and the method described above would move the content of the source block 520 into the target block 515 without using the time consuming unaligned double quadword move instruction provided in the microprocessor instruction set.

While the invention has been described with reference to numerous specific details, one of ordinary skill in the art will recognize that the invention can be embodied in other specific forms without departing from the spirit of the invention. In other places, various changes may be made, and equivalents may be substituted for elements described without departing from the true scope of the present invention. For instance, the same method can be applied to microprocessors architectures other than Intel® and to situations where shifting of operand sizes other than double quadword has similar limitations. Also, the examples given above can be used by a person of ordinary skill in the art to implement variable shift right operations, bitwise shift operations, as well as moving contents of registers to memory locations that are not aligned to a particular byte boundary.

What is claimed is:

1. A method of shifting content of a particular size in a register by a variable shift count using a microprocessor that does not allow a variable shift operation for an operand of the particular size, the method comprising:
   computing a number of bits to shift the content based on the variable shift count;
   determining, based on the number of bits to shift, whether shifting of the content is for "less than" or "greater than or equal to" half of the particular size; and
   performing two shift operations, wherein based on the determination, one of the two shifts performs a shift by 0 and the other shift performs a shift by less than the computed number of bits to shift.

2. The method of claim 1, wherein the register is a first register, the method further comprising shifting the content in the first register by half of a size of the register and storing a resulting value in a second register.

3. The method of claim 2, wherein performing the two shift operations comprises:
   performing a first shift operation on the first register in a first direction; and
   performing a second shift operation on the second register in a second direction different from the first direction.

4. The method of claim 1, wherein the two shift operations comprise a first shift operation in a left direction and a second shift operation in a right direction, wherein the first shift operation performs a shift by 0 when the number of bits to shift is less than half of the particular size, wherein the second shift operation performs a shift by 0 when the number of bits to shift is greater than or equal to the particular size.

5. The method of claim 1, wherein one of the two shift operations shifts by an absolute value of the number of bits to shift minus half of a size of the register.

6. A method of avoiding an unaligned memory move operation for moving content of a particular size from a first memory block to a second memory block using a microprocessor that does not allow a variable shift operation for an operand of the particular size, wherein the first memory block is not aligned to a particular memory address by a particular number of bits, the method comprising:
  determining whether the particular number of bits that the first memory block is not aligned to the particular memory address is "less than" or "greater than or equal to" half of the particular size;
  copying the content to a register, wherein the content has an offset of the particular number of bits in the register;
  performing at least two variable shift operations on the content to eliminate the offset in the register, wherein based on whether the particular number of bits is "less than" or "greater than or equal to" half of the particular size, one of the two shift operations performs a shift by 0 and the other performs a shift by less than the particular number of bits; and
  moving the content from the register to the second memory block.

7. The method of claim 6, wherein the content is a plurality of pixels in a video frame and the moving of the content is performed as part of a video motion compensation operation.

8. The method of claim 7, wherein the plurality of pixels is part of a macroblock in a video frame that is built by using a reference frame and a motion vector.

9. The method of claim 6, wherein the microprocessor is a single-instruction-multiple-data (SIMD) microprocessor.

10. The method of claim 6 further comprising:
  dividing the content into a first portion and a second portion of the content; and
  performing a first shift operation in a first direction on the first portion of the content and a second shift operation in a second direction on the second portion of the content.

11. The method of claim 6, wherein the moving comprises moving the content from the register to the second memory block in an aligned memory move.

12. A computer readable medium storing a computer program for shifting content of a particular size in a register by a variable shift count, the computer program for execution by a microprocessor that does not allow a variable shift operation for an operand of the particular size, the computer program comprising sets of instructions for:
  computing a number of bits to shift the content based on the variable shift count;
  determining, based on the number of bits to shift, whether shifting of the content is for "less than" or "greater than or equal to" half of the particular size; and
  performing two shift operations, wherein based on the determination, one of the two shifts performs a shift by 0 and the other performs a shift by less than the computed number of bits to shift.

13. The computer readable medium of claim 12, wherein the register is a first register, the computer program further comprising a set of instructions for shifting the content in the first register by half of a size of the register and storing a resulting value in a second register.

14. The computer readable medium of claim 13, wherein the set of instructions for performing the two shift operations comprises sets of instructions for:
  performing a shift operation on the first register in a first direction; and
  performing a shift operation on the second register in a second direction different from the first direction.

15. The computer readable medium of claim 12, wherein the two shift operations comprise a first shift operation in a left direction and a second shift operation in a right direction, wherein the first shift operation performs a shift by 0 when the number of bits to shift is less than half of the particular size, wherein the second shift operation performs a shift by 0 when the number of bits to shift is greater than or equal to the particular size.

16. The computer readable medium of claim 12, wherein one of the two shift operations shifts by an absolute value of the number of bits to shift minus half of a size of the register.

17. A computer readable medium storing a computer program for performing a motion compensation operation on a video sequence, wherein the computer program avoids performing an unaligned memory move operation when moving data of a particular size from a reference frame to a macroblock of a second video frame, wherein the data is not aligned to a particular memory address by a particular number of bits, the computer program for execution by a microprocessor that does not allow a variable shift operation for an operand of the particular size, the computer program comprising sets of instructions for:
  identifying the data in the reference frame by using a motion vector;
  determining whether the particular number of bits that the data is not aligned to the particular memory address in the reference frame is "less than" or "greater than or equal to" half of the particular size;
  copying the data to a register, wherein the data has an offset of the particular number of bits in the register;
  performing at least two variable shift operations on the data to eliminate the offset in the register, wherein based on whether the particular number of bits is "less than" or "greater than or equal to" half of the particular size, one of the two shift operations performs a shift by 0 and the other performs a shift by less than the particular number of bits; and
  moving the data from the register to the macroblock of the second video frame.

18. The computer readable medium of claim 17, wherein the data is a plurality of pixels in a video frame.

19. The computer readable medium of claim 17, wherein the macroblock in the second video frame is built by using the reference frame and a motion vector.

20. The computer readable medium of claim 17, wherein the microprocessor is a single-instruction-multiple-data (SIMD) microprocessor.

21. The computer readable medium of claim 17, wherein the computer program further comprising sets of instructions for:
  dividing the data into a first portion and a second portion of the data; and
  performing a first shift operation in a first direction on the first portion of the data and a second shift operation in a second direction on the second portion of the data.

22. The computer readable medium of claim 17, wherein the set of instructions for moving comprises a set of instructions for moving the data from the register to the macroblock of the second video frame in an aligned memory move.

* * * * *